Figure 1:
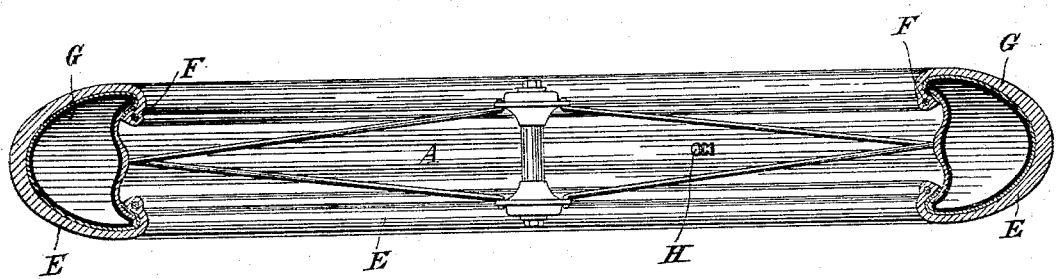

(No Model.)

K. BROWN.
PNEUMATIC TIRE.

No. 533,701.  Patented Feb. 5, 1895.

Witnesses:
Raphaël Netter
James N. Catlow

Inventor
Kirk Brown
by Duncan & Page,
Attorneys.

UNITED STATES PATENT OFFICE.

KIRK BROWN, OF MONTCLAIR, NEW JERSEY.

PNEUMATIC TIRE.

SPECIFICATION forming part of Letters Patent No. 533,701, dated February 5, 1895.

Application filed January 8, 1894. Serial No. 496,038. (No model.)

*To all whom it may concern:*

Be it known that I, KIRK BROWN, a citizen of the United States, residing at Montclair, in the county of Essex and State of New Jersey, have invented certain new and useful Improvements in Pneumatic Tires, of which the following is a specification, reference being had to the drawings accompanying and forming a part of the same.

Prior to my invention tires for cycles and other vehicles had been made of a band of rubber or rubber and canvas U shaped in cross section and forming or confining an air tight chamber around the rim of a wheel. The methods adopted or proposed for securing this cover to the rim may be described in general terms as follows: (*a*) The edges of the cover were carried around the edges of an exteriorly grooved or crescent rim and permanently fastened to the inner or under side of the same either by cement or by some mechanical fastening device. (*b*) The edges of the cover were secured or clamped to some portion of the outer or upper face of the rim. (*c*) The rim was formed with convergent edges with which the edges of the cover interlocked or were held in engagement by internal air pressure. (*d*) The edges of the cover were made sufficiently strong to resist circumferential elongation, so that after they had been placed in a grooved rim the edges of which were of greater diameter than the diameter of the edges of the cover, the latter was held in place by the internal air pressure. (*e*) The edges of the cover were reinforced in the same way, but placed on opposite sides of a rim of greater diameter than said edges, and the edges were connected over such rim by a non-extensible web or other connection.

My present invention is a tire which embodies the principle of the two classes last named, but which differs in detail from the same in the following particulars:—I use a wheel rim, the outer or tread surface of which is either concave or convex or of other configuration, but the under side of which is broadly speaking concave or so formed that the edges are of less circumference than a single central or two circumferential side grooves between the center and the edges. With such a rim I use a cover with reinforced edges the circumference of which is greater than the circumference of the rim at its edges, and this cover I apply to the rim so that the reinforced edges will lie between the edges on the inner or hub side of the rim, and so that when the tire is inflated the internal pressure will tend to draw said edges equally at all points toward and over the edges of the rim, but since the edges of the rim are of smaller diameter than the edges of the cover, the latter could only be detached from the rim when under pressure by such contraction of the edges of said cover as would reduce their circumference to that of the edges of the rim. This the metallic wires or bands embedded in the said edges prevent, and the cover is securely held to the rim as long as the air pressure within the same is maintained.

It will be understood that the function of the reinforcing wires or bands is to resist the strain tending to decrease the circumference of the edges of the tire, and that, therefore, they may be made, or applied to the tire or rim in any manner that will accomplish this result. I prefer to make them endless, in the sense that their ends are permanently connected together, but they may be made so that their ends either before or after their application to the rim may be connected by any well known means. When they are permanently joined the rim must be of special form in order to apply them, and as this is the way in which I prefer to carry out the invention I shall confine the description of the invention to such form.

Figure 2:
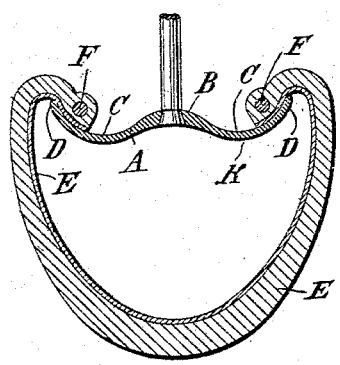

In the drawings Figure 1 represents in elevation and part section, a rim and tire embodying my invention. Fig. 2 is a cross section of a part of the same on an enlarged scale.

A is the rim of a wheel which on the outer or tread surface has a central groove or depression B. The inner or hub side of the rim has one, or as before explained, two grooves C C and the edges of the rim D D are of less circumference than the greatest circumference of the grooves C C.

E is the tire cover composed of rubber, or of rubber and canvas secured together in layers, and F F are wires or bands embedded in or incorporated with the edges of the same. These bands or reinforcements are preferably endless and have a circumference closely approximating that of the grooves C C at their deepest point. The cover may confine a rubber tube G, which is inflated by means of a valve H.

The tire is applied in the following manner: One of the wired edges at any point is first laid in the groove B and the diametrically opposite portion of the same edge is first worked over the part K of the rim which is in the line of greatest diameter. The remaining portion of the edge is then worked over in a well understood way when the cover will surround the rim but with its edges resting upon the outer or tread surface of the same along lines between the edges and the prominences K. Then by pulling over the edges one half at a time into the grooves C C, the tire is brought into the position with respect to the rim shown in the drawings.

The inner rubber tube when used, is passed under the cover at any time before the latter is fully applied.

This tire is convenient and useful in many respects and has the advantage of being easily detachable, and of affording a very perfect protection to the inner tube by excluding dust or dirt.

What I claim is—

1. The combination with a wheel rim having a groove or grooves in its inner or hub side of a tire cover having reinforced edges adapted to lie in the said groove or grooves and which are of a circumference greater than that of the edges of the groove as set forth.

2. The combination with a wheel rim having a groove in the outer or tread side and two grooves in its inner or hub side of a tire cover having reinforced or wired edges of a circumference approximately that of the said inner grooves and contained within said grooves while the cover surrounds the outer or tread portion of the rim, as set forth.

3. The combination with a wheel rim having a concave inner or tread surface of a tire cover having metallic bands attached to or incorporated with its edges which edges are of greater circumference than the edges of the inner surface of the rim, and lie in the concave portion of said inner surface whereby the tire is held to the rim by air pressure.

KIRK BROWN.

Witnesses:
ERNEST HOPKINSON,
JAMES N. CATLOW.